S. RESEK.
WATER COCK.
APPLICATION FILED MAR. 31, 1911.
1,087,257.
Patented Feb. 17, 1914.
2 SHEETS—SHEET 1.
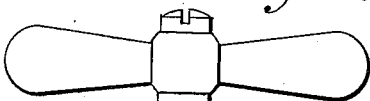
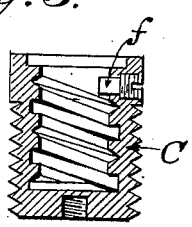
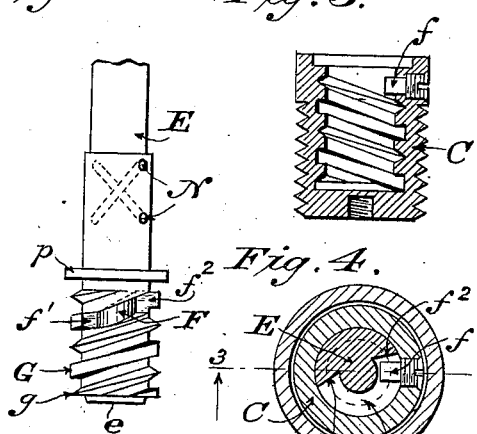
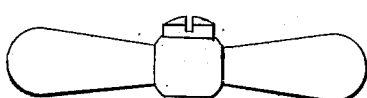
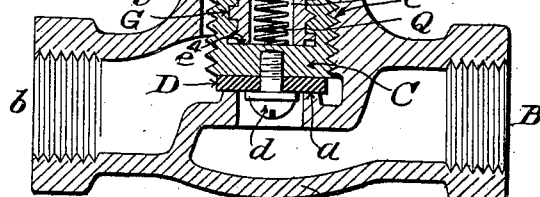
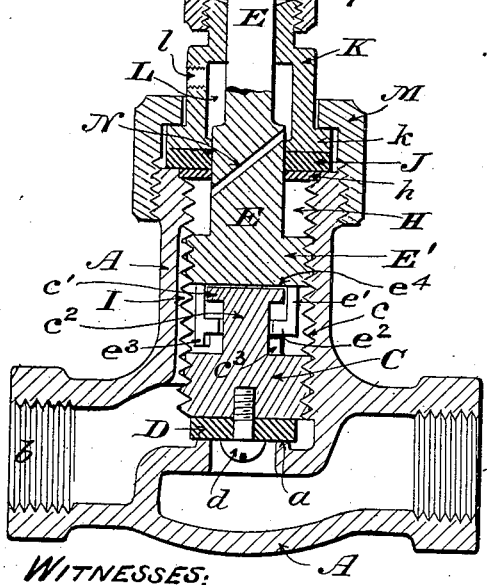
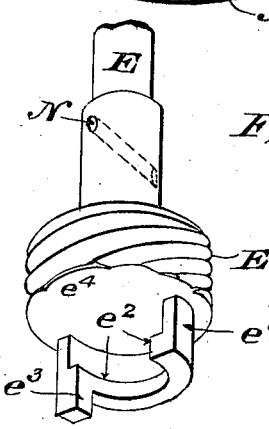
WITNESSES:
E. B. Gilchrist
H. R. Sullivan
INVENTOR:
Simon Resek
by his attorneys
Thurston & Kurs

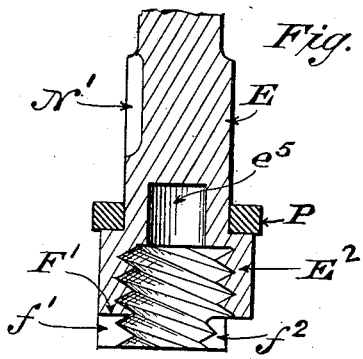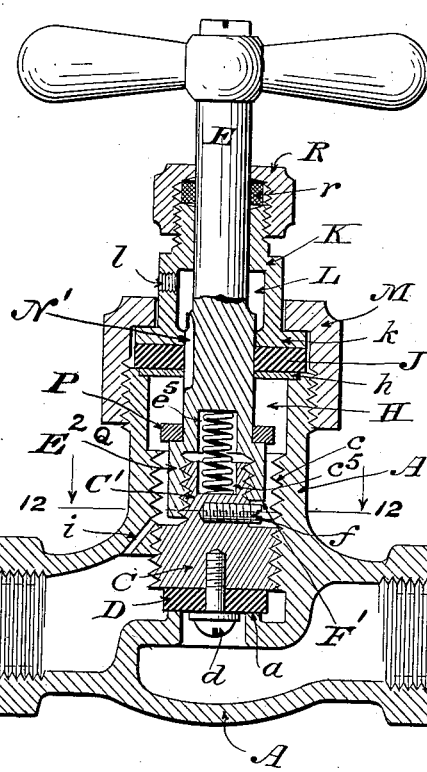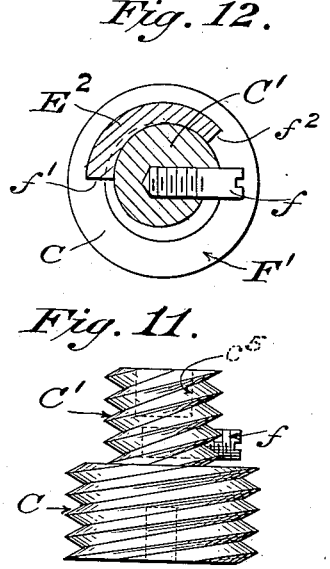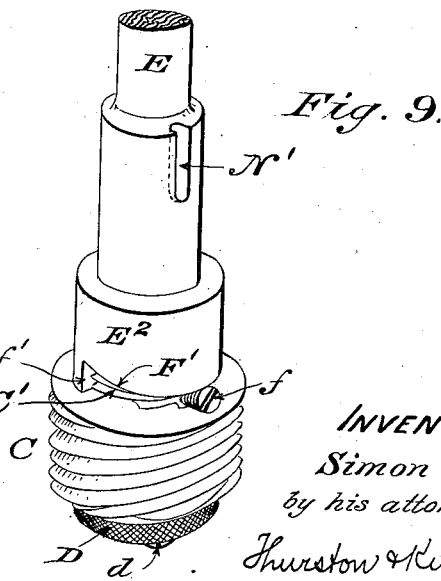

UNITED STATES PATENT OFFICE.

SIMON RESEK, OF CLEVELAND, OHIO.

WATER-COCK.

1,087,257.  Specification of Letters Patent.  Patented Feb. 17, 1914.

Application filed March 31, 1911.  Serial No. 618,248.

*To all whom it may concern:*

Be it known that I, SIMON RESEK, a citizen of the United States, residing at Cleveland, in the county of Cuyahoga and State of Ohio, have invented a certain new and useful Improvement in Water-Cocks, of which the following is a full, clear, and exact description.

This invention relates to water cocks adapted, when closed, to automatically drain off the pipes on the delivery or discharge side of the cock, (those service pipes which usually extend through a dwelling or other building,) thereby guarding against leakage or the freezing of water standing in such pipes when they are not in use.

The object of the invention is to so construct the cock that it has a drain passage through it, which is always openly connected to the discharge side of the cock, when the cock is closed and the water supply cut off, but which drain passage is itself cut off and closed, and drainage or leakage through it prevented when the cock is open for the passage of supply water.

Perhaps the most important feature of the invention lies in such construction of the cock that the drain passage will be closed before the main supply passage through the cock is opened, thereby preventing the leakage and loss of water under pressure, newly passing through the cock, and vice versa, the main supply passage through the cock is closed before the drain passage on its discharge side is opened so that drainage does not occur while there is water on the discharge side of the cock under the pressure of the street mains.

To effect these principal objects in desirable manner, the drain passage is controlled by the handle which operates the main stop plug, and these parts are so arranged that in opening the cock this handle has an initial, limited, independent, screw movement which first cuts off the drain passage before the main plug is started and raised from its seat.

The means, preferred at this time for effecting these objects of the invention, as well as other minor and contributory objects, together with some modifications of the features thereof, are shown in the accompanying drawings, in which:

Figure 1 is a longitudinal vertical section of a water cock embodying the preferred form of the invention. Fig. 2 is a detached view of the lower end of the valve stem to which the handle is attached. Fig. 3 is a sectional view of the main plug of the cock detached. Fig. 4 is a transverse horizontal section through the valve neck, etc., on the line 4, 4 of Fig. 1. Fig. 5 is a longitudinal vertical section of a water cock, showing modifications of the details of the handle stem and main plug connections. Fig. 6 is a detached perspective view of the lower end of the handle stem of the cock shown in Fig. 5, and Fig. 7 is a similar view of the main plug for same. Fig. 8 is a longitudinal vertical section of a water cock, showing still other modifications of the parts, Fig. 9 is a detached perspective view of the handle stem and main plug of the cock construction shown in Fig. 8, Fig. 10 is a vertical section of the lower end of the handle stem, Fig. 11 is a view in elevation of the main plug, Fig. 12 is a horizontal section of the handle stem, and main plug on the line 12, 12, of Fig. 8.

In the preferred construction shown in Figs. 1 to 4 inclusive, the cock body A is provided with the usual seat $a$ between the receiving side B and the discharge side $b$, and it is threaded as at $c$ for the reception of the correspondingly threaded main plug C which is provided at its seating end with the usual soft washer D, held in place by screw $d$. The main plug is internally threaded to receive the lower end of the correspondingly threaded handle stem E and it is provided with a screw $f$ the inner projecting end of which, acting as a lug, is engaged by a groove F in the handle stem. The screw threads $c$ in the cock body and on the main plug are preferably doubled and are of very quick pitch so that the main plug will be raised from its seat quickly and the cock fully opened with comparatively small turning action of the handle. These threads are shown as the ordinary standard V shape, but this is not material, for any other desired form of threads may be used instead. The screw threads G and $g$ on the lower end of the handle stem, as well as the internal threads in the main plug, engaged thereby, are also doubled and are preferably of the same quick pitch as the threads $c$ of the cock body. The groove F of the handle stem should be inclined to correspond with the pitch of the threads though this is not material if the longitudinal width of the groove is sufficient to permit of the free movement of the screw lug $f$ during the initial movement of the handle stem.

As the screw lug $f$ and groove F in the stem should always have the same radial engagement, the double screw threads G and $g$ are made in different sizes or forms, say one square and the other V shaped, as shown, so that the male threads of one will not enter or fit into the female threads of the other. This is to prevent mistakes in assembling the parts, in which operation, without some such precaution as that described, the screw connection between the stem and the main plug might be started wrongly, a half turn off, and this would not bring the groove F and screw stud $f$ into proper relation. In the upper part of the cock body is formed a chamber H which communicates with the discharge side of the cock body through a groove I, cut across the threads (as shown in Figs. 1 and 5), or through a drilled aperture $i$, (as shown in Fig. 8,) or by any other suitable means that will permit the water in the pipes, on the discharge side of the cock, to drain past the main plug, when it is seated and the cock closed, and flow into said chamber H. This chamber is closed at top by a metallic washer $h$ seated in a suitable recess in the top surface of the cock body. Above this metallic washer is a washer J of rubber or other suitable material and upon this is seated the base flange $k$ of a member K in which is a waste chamber L apertured at $l$ to permit of the final escape of the waste water therefrom, this aperture being threaded if desired to receive the end of a drip pipe or spout, well understood in the art and therefore not shown in the drawing.

The washers $h$ and J and the base flange $k$ are clamped to the body of the cock by a screw ring M in well known manner and all three of these members are bored to fit snugly upon that portion of the handle stem E which passes through them. At this point the stem is provided with an aperture N which, when the main plug is seated and the cock closed, passes through it, across its axis, or along it from a point just below the metallic washer where it opens into the water chamber H to a point just above the flange $k$ where it opens into the waste chamber L before referred to. When the cock is closed the drain passage is opened through this aperture, but when the cock is to be opened the initial independent screw movement of the handle raises this aperture until its lower end is above and out of communication with the water chamber H thereby cutting off the waste passage before the main plug is started to open the cock. In the structure under consideration (shown in Figs. 1 to 4), the handle stem E has an initial start in the opening movement before it starts the main plug C which is held on its seat by frictional contact induced when the plug was previously closed. In this initial opening movement, the handle stem turns freely in its screw-thread connection with the main plug until the shoulder or end $f'$ of its slot F engages the screw stud $f$ and through its contact therewith compels rotation of the main plug also. As just explained, this initial movement of the handle cuts off the drain passage past the washers $h$ and J through the aperture N.

In order, when the cock is open and the water chamber H filled with water under pressure, to prevent leakage through the central apertures of the washers $h$ and J which snugly fit upon the stem, the stem is provided with an annular flange $p$ upon which rests an annular washer P, of rubber or other suitable material, which, when the cock is fully opened, is raised and firmly pressed against the lower side of the metallic washer $h$ and cuts off access from said chamber to the central aperture of said washer $h$.

The member K is provided at its upper end with a packing recess $r$ and a screw collar R, of usual construction, around the handle stem E. In opening the cock, the main plug is moved by the end wall $f'$ of the slot F in the stem engaging the stud pin $f$ in the main plug, but it is considered preferable to close the main plug by contact of lower end $e^4$ of the stem with the bottom of the screw socket in the main plug rather than by contact of the other end wall $f^2$ of the slot with the stud $f$. In fact preferably, this end wall $f^2$ does not come into engagement with the stud $f$ at all.

It is considered advisable to provide the main plug C with additional restraint against movement from its seat, over that which it naturally has through the frictional resistance of its contact with the body screw threads $c$ and the clamping pressure on its seat $a$, in order that it will not move during the independent initial movement of the handle stem in closing the drain passage N between the water chamber H and waste chamber L. A desirable means for the accomplishment of this purpose is the employment of the coil spring Q, under strong compression, between the main plug and the stem and, for convenience, seated in suitable recesses $c^5$ and $e^5$ respectively of these members, as shown in Figs. 1 and 8. When the stem and plug are most widely separated, as occurs in the opening operation, this spring tends to hold them in such relative positions during a subsequent closing movement, the plug in advance say a half screw thread, more or less, as desired, until it is closed on the valve seat and arrested in its movement while the stem continues its movement, independently, to open the drain passage N. The spring Q is a convenient means for the accomplishment of this purpose but other suitable means might be employed, in fact the difference in the diameters of the screws of the stem and plug might be sufficient for the purpose, that of the plug being larger and therefore moving less freely than that of the stem, or the stem screw might be made with a much steeper pitch than that of the plug and therefore move more easily than the latter as will be readily understood.

The angular drain aperture N through the stem may consist of two inclined holes crossing and intersecting, as shown in Figs. 1 and 2, or it may be a single inclined hole as shown in Figs. 5 and 6, the first mentioned construction being considered preferable as it permits of a slightly lower level of drainage when the cock is positioned with its handle stem horizontal.

In Figs. 5, 6 and 7 are shown some modifications of the details of construction of a cock embodying the main features of this invention. The chief modification lies in changes in the construction and means for connecting the lower end of the handle stem E and the main plug C that will dispense with the internal threading of the main plug and yet permit the stem to make its preliminary movement to cut off the drain passage before starting to lift the main plug off its seat and open the cock. In this construction the screw threads $c$ for the main plug are carried considerably higher than those in Fig. 1 and a head E' is formed on the lower end of the stem with exterior threads adapted to engage the cock-body threads $c$. On the lower face of this head is a depending half-cylindrical sleeve $e'$ having at its lower edge an internal half-annular rib $e^2$ at one end of which is a depending lug $e^3$; see Fig. 6. On the upper face of the main plug C is a cylindrical extension $c^2$ of a size adapted to fit within the half-annular rib $e^2$ and having at its upper end a disk $c'$ adapted to fit within the sleeve $e'$, above the rib $e^2$. At the base of the extension $c^2$ is a lug $c^3$ which lies in the circumferential path of the depending lug $e^3$ and is adapted to be engaged thereby when the stem is turned. In assembling these parts the cylindrical extension $c^2$ and its disk head $c'$ are slipped sidewise into the open half of the sleeve $e'$ and its rib $e^2$ as shown in Fig. 5, and these parts are then screwed down into the body threads $c$ of the cock until the main plug is seated on $a$. In the opening movement the contact of lug $e^3$, after the initial drain-closing movement of the stem, with the lug $c^3$ causes the main plug to turn in opening direction. The distance from the bottom of the head E to the top of the rib $e^2$ is enough greater than the thickness of the disk $c'$ to permit of the preliminary turning and rising of the head to close the drain passage before engaging and opening the main plug. In this construction, the parts are perhaps, more easily and cheaply made and more easy to assemble than those shown in Figs. 1 to 4. A single set of screw threads $c$ in the cock body engages and serves both the main plug C and the handle stem E. In this illustration the inclined, cross drain aperture in the stem is in the form of a single hole in place of the two intersecting holes of the apertures of Fig. 1. The drain groove I cut across the body threads $c$ extends far enough to have outlet into the water chamber H when all the parts are closed down to shut the cock.

In Figs. 8 to 12 inclusive several other modifications of features of the invention are shown. In this construction the drain passage N' in the handle stem past the washers $h$ and J is in the form of a longitudinal groove in the exterior surface of the stem, the lower end of the groove being just enough below the washer $h$ to be raised past its lower surface on the initial movement of the stem. This exterior longitudinal groove interrupts the continuity of the peripheral surface of the stem and does not work as well with the washers in preserving a tight joint on the stem as does an interior passage through the stem either inclined, as shown in Figs. 1, 2, 5 and 6, or, perhaps, parallel with the axis and provided with outlets above and below the washers. The head $E^2$ at the bottom of the stem is recessed and interiorly threaded to receive a correspondingly threaded extension C' on the main plug. A screw lug $f$ is set in this extension of the main plug and is engaged by the end wall $f'$ of a circumferential notch F' in the lower edge of the head $E^2$.

In the construction of Fig. 8, the stem E has an enlarged head $E^2$ into which the extension $c'$ of the main plug screws, and the stem gets its initial longitudinal movement from this screw connection with the main plug, which latter must be held against rotation at this time as by the spring Q. In Fig. 1, however, the stem screws into the main plug which is held against premature movement by reason of its greater length of contact with the body screw-threads $c$. In Fig. 8 the main plug C is of less depth than that of Fig. 1 and when seated does not extend as far up into the threaded portion of the chamber H. In this construction the lower portion of the drain passage is formed by an aperture $i$ extending from the drain side of the cock into the chamber H just above the top of the plug, as shown. When open the main plug closes this aperture $i$ while the stem aperture N' is closed by the washers $h$ and J thus effecting a double closure of the drain passage.

Having thus described the invention, what is claimed as new and useful is:

1. In a water cock having a drain passage from its delivery side, the combination of a cock body with a seat, a main-plug having screw-threaded mounting and adapted to engage said seat, a handle-stem provided with independent screw-threaded mounting and adapted to control said drain passage and also the main-plug, with means for so connecting the handle-stem to the main-plug that the handle-stem may have an initial preliminary screw movement before it operates the main-plug to open the cock whereby it cuts off the drain passage before moving the main-plug.

2. In a water cock having a drain passage from its delivery side, the combination of a cock body with a seat, a main-plug having screw-threaded mounting and adapted to engage said seat, a handle-stem provided with independent screw-threaded mounting and adapted to control said drain passage and also the main-plug, with means for so connecting the handle-stem to the main-plug that the handle-stem may have continued independent screw movement after it has seated the main-plug whereby the closed drain passage controlled by the handle-stem remains closed until after the pressure supply is cut off by the main-plug, and is then opened by the continued movement of the handle-stem.

3. In a water cock having a drain passage from its delivery side, the combination of a cock body having a seat and an internally screw-threaded neck, a main plug adapted to engage the seat and mounted in the screw threading in the neck, a handle stem adapted to control said drain passage and provided with independent screw-threaded mounting whereby it may move independently of the main plug, with means for so connecting the handle stem and main plug that the handle stem may have limited screw movements independently of the screw movements it imparts to the main plug.

4. In a stop and waste cock, a body having inlet and outlet with a valve seat between, a valve for said seat, and a compound valve stem comprising a threaded member fixed to said valve and a second member in threaded engagement with the first member for movement endwise on the same and provided with a waste outlet.

5. In a stop and waste cock, a body having inlet and outlet with a valve seat between, a valve for said seat, and a compound valve stem comprising a threaded member fixed to said valve and a member in threaded engagement with the first member for movement endwise on the same, one of said members being provided with a waste outlet.

6. In a water cock having a drain passage from its delivery side, the combination of a cock body having a seat and a neck in alinement above said seat and interiorly screw threaded, a main plug engaging said threads, adapted to engage said seat and provided with another or second set of screw threads and a laterally projecting stud pin, a handle stem adapted to control the drain passage, screw threaded to engage the last mentioned threads of the main plug and having a slot adapted to coöperate with the stud pin of the main plug, whereby said handle stem may have an independent, limited, initial, screw-movement to cut off the drain passage before it operates to open the main plug.

7. In a water cock having a drain passage from its delivery side, the combination of a cock body having a seat and a neck in alinement above said seat, interior screw threads in said neck, a main plug engaging said screw threads, adapted to engage said seat and having a screw threaded interior recess with a stud pin projecting into the recess, a handle stem adapted to control said drain passage and close it on the initial movement of the stem, screw threads on the lower end of the stem adapted to engage the threaded recess of the main plug and a slot in the stem adapted to be engaged by the stud pin of the main plug; whereby the handle stem may have an initial limited screw-movement to cut off the waste passage before moving the main plug and opening the cock.

8. In a water cock having a drain passage from its delivery side, the combination of a cock body having a seat and a neck in alinement above the seat, a main plug having a screw-thread mounting in the neck of the cock and adapted to engage said seat, a handle stem adapted to control the drain passage, provided with screw mounting and adapted to operate the main plug and having a limited rotatable movement with relation thereto, whereby the handle stem will have a limited initial screw-movement before it rotatably connects with and moves the main plug, substantially as described.

9. In a water cock having a drain passage from its delivery side, the combination of a cock body having a seat and a neck in alinement above the seat, a main plug having screw-thread mounting in said neck and adapted to engage said seat, a handle stem adapted to control said drain passage and screw connected with the main plug in such manner as to have a limited, initial screw movement before it moves the main plug, with an expanding spring between the handle stem and the main plug tending to press and hold the latter upon its seat during such independent movement of the handle stem.

10. In a water cock, the combination of a main plug, a handle stem to operate said main plug and screw connected therewith, a stud in one member and a slot engaged thereby in the other member, whereby the handle stem may have a limited, independent screw-movement before it operates the main plug, the screw connection between the main plug and handle stem being a quick pitch double thread, each thread being of a different size or shape from the other so that it will not engage the groove of the other, thereby compelling correct assemblage of these parts to bring the said slot and stud into proper operative relation.

In testimony whereof, I hereunto affix my signature in the presence of two witnesses.

SIMON RESEK.

Witnesses:
E. C. WILLIAMS,
W. P. OSGOOD.

Copies of this patent may be obtained for five cents each, by addressing the "Commissioner of Patents, Washington, D. C."